Nov. 8, 1927.

H. A. S. HOWARTH 1,648,049

COOLING SYSTEM FOR THRUST BEARINGS

Filed Aug. 10, 1922     2 Sheets-Sheet 1

Inventor
Harry A. S. Howarth

By Mauro, Cameron, Lewis & Massey
Attorneys

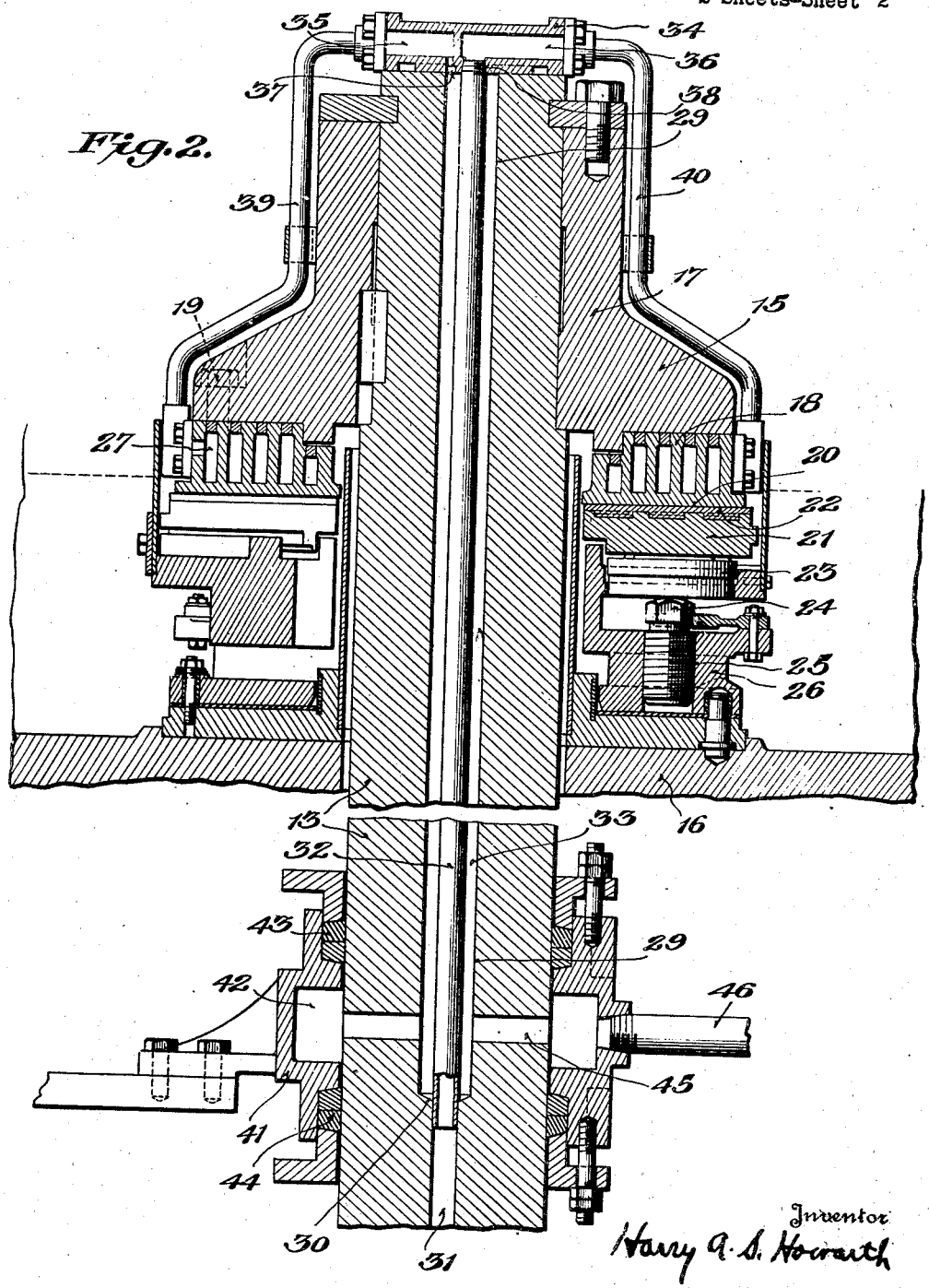

Patented Nov. 8, 1927.

1,648,049

UNITED STATES PATENT OFFICE.

HARRY A. S. HOWARTH, OF PHILADELPHIA, PENNSYLVANIA, ASSIGNOR, BY MESNE ASSIGNMENTS, TO KINGSBURY MACHINE WORKS, INC., OF PHILADELPHIA, PENNSYLVANIA, A CORPORATION OF DELAWARE.

COOLING SYSTEM FOR THRUST BEARINGS.

Application filed August 10, 1922. Serial No. 580,965.

This invention relates to thrust bearings and, while of utility in conjunction with thrust bearings applied to a wide variety of uses, has particular reference to thrust bearings for electrical apparatus.

It has heretofore been proposed in the patent to Albert Kingsbury, 1,260,548, granted March 26, 1918, to cool the bearing surfaces of a thrust bearing by forming the stationary bearing member as a collar provided interiorly with passages in proximity to its bearing surface through which a cooling fluid may be circulated. When the bearing includes tiltable or flexible bearing segments or shoes to provide for the automatic formation of wedge-shaped oil films between the bearing surfaces in conformity with the principle of the Kingsbury bearings, the use of a collar with cooling passages in proximity to its bearing surface as the stationary bearing member requires that the tiltable or flexible bearing segments or shoes form a part of the rotatable bearing member This arrangement is not always desirable because the bearing segments or shoes are subjected to centrifugal force owing to their rotation and must be constrained against radial movement under the action of such force; moreover the mounting of the tiltable bearing segments or shoes as a part of the rotatable bearing member affects the facility of assembly and disassembly of the bearing parts. If the collar with cooling passages form a part of the rotatable bearing member, on the other hand, so as to permit the bearing segments or shoes to form a part of the stationary bearing member, there is introduced the difficulty of supplying the cooling passages in the rotatable member with a cooling fluid, owing to the difficulty of maintaining fluidtight joints or connections between said rotatable member and the stationary parts which convey the cooling fluid to and from said member. Even though packing glands or stuffing boxes be employed which prevent leakage when the bearing is assembled, the wear between the relatively rotatable parts soon results in leakage between said parts. This becomes of particular moment in the case of thrust bearings for electrical apparatus, such as hydro-electric units for example, where it is common to dispose the thrust bearing above the electrical apparatus so that it sustains the weight of the unit. In such an arrangement, water leaking from the thrust bearing parts may flow down onto the electrical apparatus and injure the same.

It is an object of this invention to provide a thrust bearing with cooling passages in the relatively rotatable bearing member and with means for supplying said cooling passages with a cooling fluid which avoids the difficulties which would arise from leakage if the cooling fluid should be supplied to said rotatable member through a relatively stationary supply system cooperating therewith.

Another object of this invention is to provide a thrust bearing for electrical apparatus whereby the rotatable bearing member may be cooled by circulating a cooling fluid therethrough without danger of injury to the electrical apparatus.

Another object of this invention is to provide a thrust bearing for turbine units which takes advantage of the suction created by the operation of the turbine to facilitate the circulation of a cooling fluid through the bearing parts.

Other objects relate to the provision of a cooling system for the rotatable member of a thrust bearing which is simple in construction and which enables the efficient cooling of the bearing surfaces without complicating the bearing and without danger of leakage of the cooling fluid in a manner to cause injury to the apparatus with which said bearing is associated.

Stated broadly the invention comprises a thrust bearing including relatively rotatable bearing members, cooling passages in the rotatable bearing member, and a passage in the shaft communicating with said cooling passages and through which said cooling passages are supplied with a cooling fluid. Said shaft passage is supplied with the cooling fluid at any suitable point where any leakage that may occur will not injure the apparatus with which the thrust bearing is associated. In the case of electrical apparatus, the shaft passage is supplied with the cooling fluid below the electrical apparatus so that any escaping fluid cannot flow downwardly onto the electrical apparatus. The cooling fluid is withdrawn from the cooling passages at any suitable point where injury from leakage will not occur, preferably below the apparatus with which the thrust bearing is associated, especially in the case of electrical apparatus. In the event that the thrust bearing is used in conjunction with a turbine, the exit of the cooling passages is preferably so disposed that the cooling fluid passing through the same is subjected to the suction created by the operation of the turbine so that advantage may be taken of this suction to facilitate circulation of the cooling fluid through said passages.

The invention is capable of receiving a variety of mechanical expressions, one of which is shown on the accompanying drawings, but it is to be expressly understood that the drawings are for the purpose of illustration only and are not to be construed as a definition of the limits of the invention, reference being had to the appended claims for that purpose.

In said drawings—

Fig. 2 is an axial section through a thrust bearing embodying the present invention.

Figure 1:
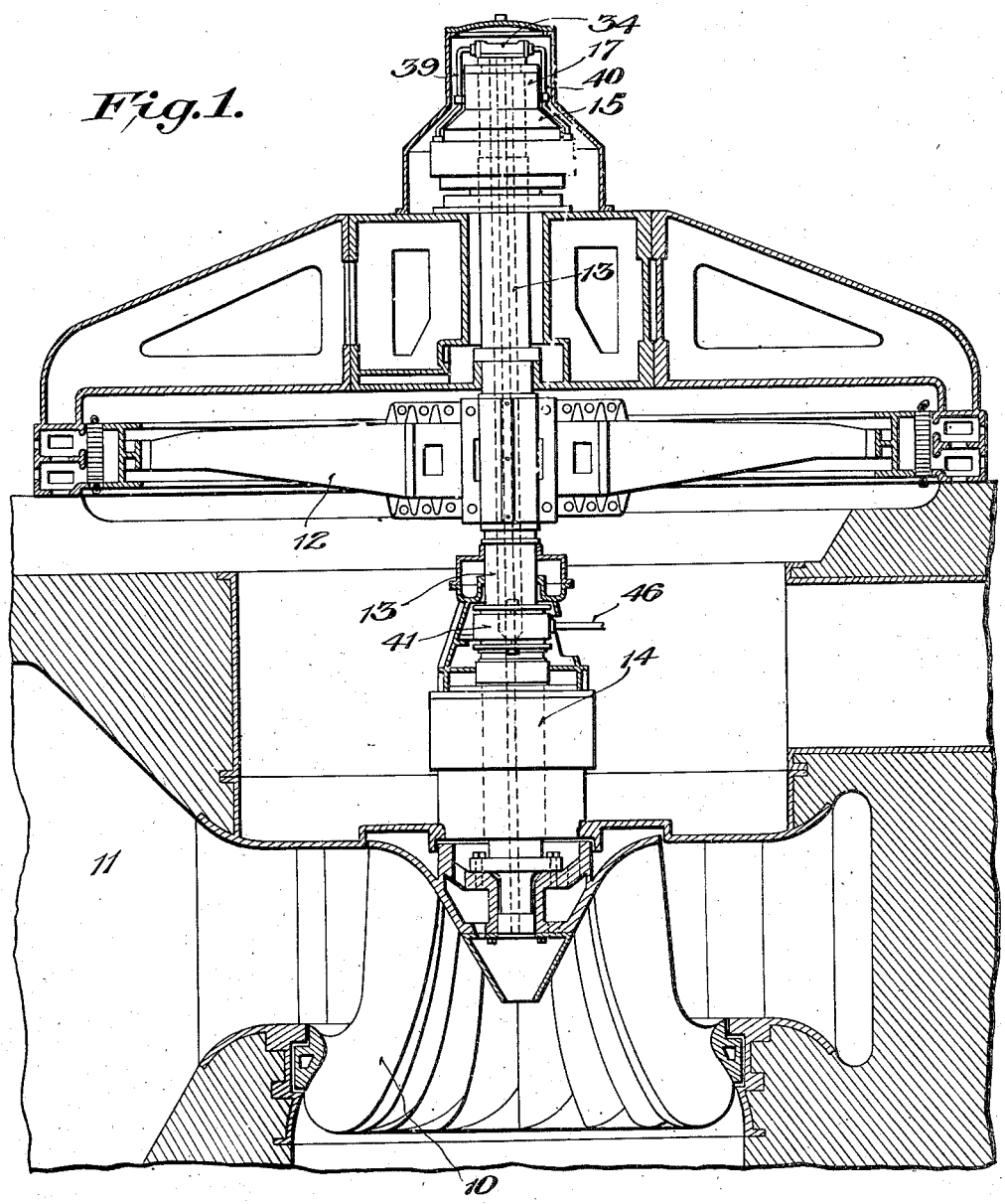
Fig. 1 is a schematic elevation of a hydro-electric unit equipped with the present invention.
Figure 3:
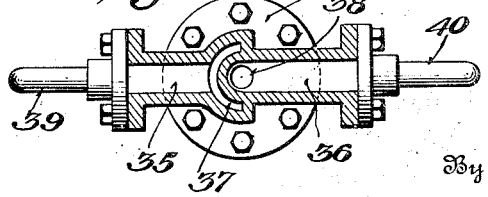
Fig. 3 is a transverse section through a member constituting means of communication between the shaft passages and the cooling passages in the rotatable bearing member.

Fig. 1 illustrates schematically a hydro-electric unit of any suitable construction provided with a thrust bearing which is cooled in conformity with the present invention. A turbine 10, supplied with water through the intake 11, drives any suitable electrical apparatus, such as a generator 12. The shaft 13 of the unit is shown as provided with any suitable steady bearing 14 and, at the upper end of the shaft, with a thrust bearing 15 of any suitable construction.

In the form illustrated, the shaft 13 extends through an aperture in a suitable frame or foundation 16 and carries a thrust block 17 of any suitable construction keyed thereto in any suitable way. Mounted on said thrust block 17 is a thrust collar 18 connected therewith in any suitable way, as by bolts 19. Cooperating with the bearing surface 20 of said thrust collar is a stationary bearing member of any suitable construction, shown as comprising a plurality of bearing segments or shoes 21 having bearing surfaces 22 and flexibly or tiltably mounted, through interposed blocks 23, on the spherically-shaped heads 24 of adjustable jack screws 25 in a base ring 26 of any suitable construction. As the details of construction of the stationary bearing member constitute no part of the present invention further description thereof is deemed to be unnecessary.

In conformity with the present invention, the thrust collar 18 is provided with cooling passages 27 in proximity to the bearing surface 20 of said collar, said cooling passages having any suitable arrangement for conveying cooling fluid therethrough in heat-abstracting relation to said bearing surface. For example, said cooling passages may divide at the inlet and cause the cooling fluid to flow back and forth any desired number of times before they join at the outlet, or they may take the form of a spiral extending from the inner to the outer periphery of the collar, or vice versa. While the cooling passages have been shown as formed in a separate collar mounted on the thrust block, however, it is to be understood that if desired a separate thrust collar may be dispensed with and the thrust block itself may be provided with interior cooling passages in proximity to its bearing surface.

In conformity with the present invention, the shaft is also provided interiorly with one or more passages supplying the cooling passages 27 with a cooling fluid. In the form shown, the shaft is drilled or bored, as illustrated at 29, from its upper end to a point 30 below the place where the cooling fluid is to be introduced into the passage afforded by said bore 29, and a bore of smaller diameter, as illustrated at 31, is continued to a suitable exit or delivery opening, preferably at or adjacent to the lower end of the shaft. Mounted within the bore 29 is a pipe 32, which is of smaller diameter than the bore 29 so as to provide an annular inlet passage 33 between the interior wall of the bore 29 and the exterior wall of the pipe 32, and which communicates with the bore 31 of reduced diameter to constitute therewith an outlet passage.

The inlet and outlet passages thus provided in the shaft communicate with the cooling passages 27 in the rotatable bearing member in any suitable way. In the form shown, a housing member 34 is secured on the end of the shaft 13 so as to provide a fluid-tight joint therewith and is provided interiorly with separate passages 35 and 36. Passage 35 has an inlet opening 37 which registers with the bore or passage 29 in the shaft 13, and passage 36 has an outlet opening 38 which receives the upper end of the pipe 32. If desired said housing may be provided with a strainer to prevent entrance of dirt into the cooling passages, and may also be supplied with an air cock to permit escape of air and for testing whether or not the system is full of cooling fluid. The passages 35 and 36 in the member 34 in turn communicate respectively with the inlet and outlet of the cooling passages 27 in any suitable way. In the construction illustrated, pipes 39 and 40 are suitably secured at their upper ends to the member 34 so as to form fluid-tight joints therewith and are in communication with the passages 35 and 36 respectively, and said pipes are suitably secured at their lower ends to the thrust collar 18 so as to form fluid-tight joints therewith and are in communication with the inlet and the outlet respectively of said cooling passages 27. It is to be expressly understood, however, that while the conduits affording communication between the shaft passages and the cooling passages have, for convenience of construction, been shown as applied exteriorly to the shaft, the thrust block and the collar, said conduits may if desired be formed interiorly of these members.

The inlet passage in the shaft is supplied with a cooling fluid in any suitable way. In the form shown, the shaft is surrounded by a stationary housing member 41 provided with an interior annular chamber 42 and having at its opposite ends packing glands 43 and 44 to minimize or prevent leakage from the interior of said member along the shaft. The chamber 42 of the stationary member 41 is in communication with the bore 29 of the shaft 13 through one or more radially disposed passages 45, and also in communication with any suitable source of cooling fluid through pipe 46. When the cooling system of the present invention is applied to a thrust bearing for a water turbine, the pipe 46 may conveniently communicate with the intake of the turbine if sufficient pressure exists therein to effect the desired circulation of water through the shaft and cooling passages. It is to be expressly understood, however, that the cooling fluid may be supplied to the chamber 42 by any suitable means or from any suitable source. The stationary member through which the shaft passage is supplied with cooling fluid may be positioned at any desired point along the shaft where leakage therefrom will not injure the apparatus with which the thrust bearing is associated. Thus, as illustrated in Fig. 1, the member 41 is disposed below the electrical apparatus and may be conveniently located adjacent to or be formed as a part of the steady bearing 14. In fact where the steady bearing is lubricated by water under pressure, as is sometimes the case, the water may be taken directly from the steady bearing or its supply thereto if the pressure is sufficient to effect the desired circulation through the shaft and cooling passages.

The exit of the delivery passage 32, 31 may be located at any desired point where there is no danger of injury to the associated apparatus from any leakage that may occur. As above pointed out, the said exit may be disposed at or adjacent to the end of the shaft, and is preferably so positioned when the thrust bearing is associated with a turbine unit, as illustrated in Fig. 1, so that the suction created by the operation of the turbine may be taken advantage of in facilitating the circulation of the cooling fluid through the shaft and cooling passages. When the exit of the delivery passage 31 is located at or adjacent to the end of the shaft carrying the water wheel, the suction existing at the apex of the cone at the upper end of the water wheel will aid in effecting a discharge of the water from the outlet passage 32, 31 into the draft tube.

In operation, the cooling fluid flows through the pipe 46 into the chamber 42, and from the latter through the passages 45, which are constantly in communication with the chamber 42, into the inlet passage 33. In the latter passage the cooling fluid flows up the shaft, and through the passage 35 and pipe 39 into the inlet of the cooling passages 27. After circulating through said cooling passages the cooling fluid flows out through the pipe 40 and passage 36 into the pipe 32, whence it is discharged through the passage 31.

It will therefore be perceived that a thrust bearing has been provided with cooling passages in the relatively rotatable bearing member while avoiding at the thrust bearing any joint between relatively rotatable parts in the system for supplying said passages with cooling fluid. Thereby all danger of leakage at the thrust bearing, and flow of the cooling fluid down onto the apparatus with which the bearing is associated, is entirely avoided. This is of relatively great moment when the thrust bearing is associated with electrical apparatus, as illustrated in Fig. 1, as it is apparent that the inevitable leakage from a joint between relatively rotatable parts in a water circulating system, if located at the thrust bearing, would result in water flowing down onto and injuring the electrical apparatus. By supplying the inlet passage with cooling fluid below the electrical apparatus, however, and forming the passages to and from the cooling passages in or on the rotatable parts, any leakage that may occur at a joint between relatively rotatable parts can cause no injury. At the same time, advantage has been taken of the suction arising from the operation of the turbine, when the thrust bearing is associated with a turbine unit, to facilitate the circulation of cooling fluid through the cooling passages. Moreover, the rotatable member of the bearing has been provided with cooling passages whereby the bearing surfaces may be efficiently cooled by a fluid circulated in proximity thereto without materially complicating the bearing and without the necessity of mounting the flexible or tiltable bearing segments or shoes, when such are employed, as a part of the rotatable bearing member.

While the embodiment of the invention illustrated on the drawings has been described with considerable particularity, it is to be expressly understood that the invention is not limited thereto, as the same is capable of receiving a variety of mechanical constructions, some of which will now readily suggest themselves to those skilled in the art, while changes may be made in the details of construction, arrangement and proportion of parts, and certain features used without other features thereof, without departing from the spirit of the present invention. Reference is therefore to be had to the claims hereto appended for a definition of the limits of said invention.

What is claimed is:

1. A thrust bearing for electrical units including electrical apparatus and relatively rotatable thrust-bearing members associated with the shaft of said apparatus above the same, one of said bearing members having passages for a cooling fluid and said shaft having inlet and outlet passages for the cooling fluid in communication with said passages in the bearing member.

2. A thrust bearing for electrical units including electrical apparatus and relatively rotatable thrust-bearing members associated with the shaft of said apparatus above the same, one of said bearing members having passages for a cooling fluid and said shaft having a passage in communication with said passages in the bearing member, and means for introducing a cooling fluid into said shaft passage below said electrical apparatus.

3. A thrust bearing for electrical units including electrical apparatus and relatively rotatable thrust-bearing members associated with the shaft of said apparatus above the same, one of said bearing members having passages for a cooling fluid and said shaft having inlet and outlet passages in communication with said passages in the bearing member, and means for introducing a cooling fluid into and withdrawing the same from said shaft passages below said electrical apparatus.

4. A thrust bearing for electrical units including electrical apparatus and relatively rotatable thrust-bearing members associated with the shaft of said apparatus above the same, the rotatable bearing member having passages for a cooling fluid and said shaft having a passage in communication with said passages in the bearing member, and a stationary member surrounding said shaft below said electrical apparatus and having its interior in communication with said shaft passage and a source of cooling fluid.

5. A thrust bearing for electrical units including electrical apparatus and relatively rotatable thrust-bearing members associated with the shaft of said apparatus above the same, the rotatable bearing member having passages for a cooling fluid and said shaft having inlet and outlet passages in communication with said passages in the bearing member, and means for supplying said inlet passage with a cooling fluid, said outlet passage delivering the cooling fluid through the lower end of said shaft.

6. A thrust bearing for electrical units including electrical apparatus and relatively rotatable thrust bearing members associated with the shaft of said apparatus above the same, the rotatable bearing member having passages for a cooling fluid and said shaft having inlet and outlet passages in communication with said passages in the bearing member, and a stationary member surrounding said shaft below said electrical apparatus for supplying said inlet passage with a cooling fluid, said outlet passage delivering the cooling fluid through the lower end of said shaft.

7. In a rotatable thrust bearing, a shaft having a thrust collar provided with a radially extending bearing surface surrounding said shaft, said collar being provided with interior cooling passages in proximity to its bearing surface, and a cooperating bearing member, said shaft having passages for conveying a cooling fluid to and from said passages in the thrust collar.

8. In a rotatable thrust bearing, a shaft having a thrust collar provided with a radially extending bearing surface surrounding said shaft, said collar being provided with interior cooling passages in proximity to its bearing surface, and tiltable bearing segments cooperating with said bearing surface, said shaft having inlet and outlet passages for a cooling fluid in communication with the passages in said thrust collar.

9. In a thrust bearing, a shaft having relatively rotatable thrust-bearing members associated therewith, the rotatable bearing member having cooling passages and said shaft having a passage for conveying a cooling fluid to the passages in said bearing member, and a stationary member surrounding the shaft and having its interior in communication with said shaft passage and a cooling fluid conduit.

10. In a thrust bearing, a shaft having relatively rotatable thrust-bearing members associated therewith, the rotatable bearing member having cooling passages and said shaft having inlet and outlet passages extending longitudinally thereof for conveying cooling fluid to and from said passages in the bearing member.

11. In a thrust bearing, a shaft having relatively rotatable thrust-bearing members associated therewith, the rotatable bearing member having cooling passages and said shaft having a passage in communication with the inlet of said cooling passages and a source of cooling fluid, and a pipe in said passage in communication with the outlet of said cooling passages, said pipe forming with said shaft passage a passage for the cooling fluid.

12. In a thrust bearing, a shaft provided with a thrust collar, a cooperating bearing member, said shaft having inlet and outlet passages and said thrust collar having cooling passages, and a housing cooperating with the end of said shaft and said collar and forming means of communication between said shaft passages and said cooling passages.

13. In a thrust bearing for a water turbine, relatively rotatable bearing members associated with the shaft of said turbine, the rotatable bearing member having cooling passages and said shaft having inlet and outlet passages for a cooling fluid in communication with said cooling passages, said outlet passage having a delivery opening where the cooling fluid flowing therethrough is subjected to the suction created by the operation of the turbine.

14. In a thrust bearing for a water turbine, relatively rotatable bearing members associated with the shaft of the turbine, the rotatable bearing member having cooling passages and said shaft having an inlet passage communicating with said cooling passages and a source of water supply and an outlet passage communicating with said cooling passages, said outlet passage having its delivery opening at the end of the shaft carrying the turbine rotor.

15. In a thurst bearing, a shaft provided with a thrust block, a collar mounted thereon and provided with a bearing surface and cooling passages, said shaft having inlet and outlet passages for a cooling fluid, and means of communication between said shaft passages and said cooling passages.

16. In a thrust bearing, a shaft provided with a thrust block, a collar mounted thereon and provided with a bearing surface and cooling passages, said shaft having inlet and outlet passages for a cooling fluid, and conduits carried by said thrust block and constituting means of communication between said shaft passages and said cooling passages.

17. In a thrust bearing for turbines, relatively rotatable bearing members including a thrust collar and a thrust receiving member, one of said bearing members having cooling passages, means for supplying said passages with cooling fluid, and means for discharging the cooling fluid provided with an exit where said fluid is subjected to suction resulting from the operation of the turbine.

18. In a thrust bearing for turbines, relatively rotatable bearing members including a thrust collar and a thrust receiving member, the rotatable bearing member having cooling passages, a shaft having passages for conveying cooling fluid to and from said cooling passages, and means for discharging the cooling fluid provided with an exit where said fluid is subjected to suction arising from operation of the turbine.

In testimony whereof I have signed this specification.

HARRY A. S. HOWARTH.